| (12) | United States Patent | (10) Patent No.: US 11,187,791 B2 |
| | Ye | (45) Date of Patent: Nov. 30, 2021 |

(54) LIDAR AND INTELLIGENT SENSING DEVICE

(71) Applicant: SUTENG INNOVATION TECHNOLOGY CO., LTD., Shenzhen (CN)

(72) Inventor: Gaoshan Ye, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/183,309

(22) Filed: Feb. 23, 2021

(65) Prior Publication Data

US 2021/0181314 A1   Jun. 17, 2021

Related U.S. Application Data

(63) Continuation of application No. PCT/CN2020/107322, filed on Aug. 6, 2020.

(30) Foreign Application Priority Data

Aug. 7, 2019  (CN) .......................... 201910727564.8
Aug. 27, 2019 (CN) .......................... 201910797078.3

(51) Int. Cl.
   *G01S 7/48*  (2006.01)
   *G01S 7/481* (2006.01)

(52) U.S. Cl.
   CPC .......... *G01S 7/4817* (2013.01); *G01S 7/4813* (2013.01); *G01S 7/4814* (2013.01)

(58) Field of Classification Search
   None
   See application file for complete search history.

(56) References Cited

U.S. PATENT DOCUMENTS 7,009,752 B1 *  3/2006  Lorell ................. G02B 7/1821
                                                         359/198.1
RE46,672 E   *  1/2018  Hall ....................... G01S 17/89
                    (Continued)

FOREIGN PATENT DOCUMENTS

CN    205928334 U    2/2017
CN    206749676 U   12/2017
                    (Continued)

OTHER PUBLICATIONS

First Office action issued in related Chinese Application No. 201910797078.3, dated Oct. 16, 2019, 40 pages.

*Primary Examiner* — Hovhannes Baghdasaryan
(74) *Attorney, Agent, or Firm* — Bayes PLLC (57) ABSTRACT

This application relates to the field of radar technologies, and in particular, to a laser radar and an intelligent sensing device. The laser radar includes a radar body, a laser emitter board, a laser receiver board, and a counterweight structure. The laser emitter board and the laser receiver board are separately disposed on the laser body. The laser emitter board is configured to emit an emergent laser toward a detection target. The laser receiver board is configured to receive a reflected laser reflected by the detection target, and convert an optical signal into an electrical signal, so as to analyze a position, a three-dimensional image, a speed, and the like of the detection target. The radar body is connected to a power apparatus, and the power apparatus drives the entire radar body and the laser emitter board and the laser receiver board that are located on the radar body to rotate, so that the laser radar can detect a range of 360° around. In the present disclosure, the counterweight structure is disposed on the radar body, so that the radar body rotates more stably, thereby effectively ensuring precision of the radar and extending a service life of the radar.

14 Claims, 8 Drawing Sheets

(56) References Cited

U.S. PATENT DOCUMENTS

| | | | | |
|---|---|---|---|---|
| 2011/0216304 A1* | 9/2011 | Hall | ........................ | G01S 17/89 |
| | | | | 356/4.01 |
| 2016/0161600 A1 | 6/2016 | Eldada et al. | | |
| 2020/0209367 A1* | 7/2020 | Qiu | ....................... | G01S 17/894 |

FOREIGN PATENT DOCUMENTS

| | | |
|---|---|---|
| CN | 207582557 U | 7/2018 |
| CN | 108828557 A | 11/2018 |
| CN | 108828558 A | 11/2018 |
| CN | 109444852 A | 3/2019 |
| TW | M479170 U | 6/2014 |

\* cited by examiner

LIDAR AND INTELLIGENT SENSING DEVICE

CROSS-REFERENCE TO RELATED APPLICATIONS

The present application is a bypass continuation of PCT/CN2020/107322 with an international filing date of Aug. 6, 2020, and a priority date of Aug. 7, 2019, the entirety of which is hereby incorporated herein by reference. The present application is also related to and claims the benefit and priority of CN 201910727564.8 filed Aug. 7, 2019 and CN 201910797078.3 filed Aug. 27, 2019, the entirety of each of which is hereby incorporated by reference.

TECHNICAL FIELD

Embodiments of the present disclosure relate to the field of lidar technologies, and in particular, to a lidar and an intelligent sensing device.

BACKGROUND

A lidar is a lidar system that emits a laser beam to detect characteristic quantities such as a position and a speed of a target. In a mechanical lidar, a laser emitter part and a laser receiver part of the lidar are driven to rotate, so that a detection range of the lidar is larger.

In a process of implementing the present disclosure, the inventor of the present disclosure finds the following problems: currently, a lidar includes a comparatively large quantity of electronic devices and optical devices, optical path cooperation in between is comparatively complex, and weights of various parts are also different. Therefore, in a process of rotary scanning by the lidar, a center of gravity of a lidar body deviates from a center position of the lidar body, and device abrasion occurs. This affects a service life and detection precision of the lidar. In addition, because the lidar includes a comparatively large quantity of internal devices, heat insulation and optical crosstalk between the internal devices also become important factors that affect performance of the lidar.

SUMMARY

An objective of embodiments of the present disclosure is to provide a lidar and an intelligent sensing device, so that counterweight of a radar body of the lidar is more rational, and the lidar body rotates more stably, thereby effectively ensuring precision of the radar and extending a service life of the radar.

An embodiment of the present disclosure proposes a lidar, including a lidar body (300) and a lidar base (400), where a center shaft (401) is disposed on the lidar base (400), and the lidar body (300) is sleeved on the center shaft (401);

the lidar body (300) includes a base plate (310) and a first counterweight slot (311), the first counterweight slot (311) is provided at an edge of the base plate (310) and is in a ring shape around the base plate (310), the first counterweight slot (311) includes a lower edge (3112), at least one first fixing hole (315) is provided at the lower edge (3112), and the first fixing hole (315) enables a first counterweight block (313) to be adjusted along a peripheral direction of the base plate (310) and toward an axis of the center shaft (401), and fixes the first counterweight block (313) at any position of the first fixing hole (315); and the lidar body (300) may rotate relative to the lidar base (400).

Another embodiment of the present disclosure proposes a laser lidar, including a lidar body (300) and a lidar base (400), where a center shaft (401) is disposed on the lidar base (400), and the lidar body (300) is sleeved on the center shaft (401);

the lidar body (300) includes a base plate (310) and a first counterweight tray (320), the first counterweight tray (320) is disposed at the bottom of the base plate (310), a second counterweight slot (321) is formed at an edge of the base plate (310), the second counterweight slot (321) is in a ring shape around the base plate (310), the counterweight tray (320) includes a second counterweight edge (324), at least one third fixing hole (322) is provided at the second counterweight edge (324), and the third fixing hole (322) enables a second counterweight block (323) to be adjusted along a peripheral direction of the base plate (310) and toward an axis of the center shaft (401), and fixes the second counterweight block (323) at any position of the third fixing hole (322); and the lidar body (300) may rotate relative to the lidar base (400).

Another embodiment of the present disclosure proposes a lidar, including a lidar body (10), where the lidar body (10) includes an axis connecting portion (11), a base plate (12), a lens bracket (13), a connecting vertical plate (14), a counterweight piece (15), a laser emitter board (20), and a laser receiver board (30);

the axis connecting portion (11) is located at a center of the base plate (12) and is perpendicularly connected to the base plate (12), the lens bracket (13) is disposed on a side of the axis connecting portion (11), the connecting vertical plate (14) is disposed on the other side of the axis connecting portion, center positions of the connecting vertical plate (14) and the lens bracket (13) are on a same plane, and the connecting vertical plate (14) and the lens bracket (13) are perpendicularly connected to the base plate (12); and the connecting vertical plate (14) is located between the laser emitter board (20) and the laser receiver board (30) to isolate the laser emitter board (20) and the laser receiver board (30), an end of the connecting vertical plate (14) is connected to the axis connecting portion (11), the other end of the connecting vertical plate (14) fixes the counterweight piece (15) at a position that is at an edge of the base plate (12) and opposite to the lens bracket (13), and the lens bracket (13) is disposed on the base plate (12).

Another embodiment of the present disclosure proposes an intelligent sensing device, including the lidar according to any one of the foregoing embodiments.

In the embodiments, the counterweight piece is properly disposed, so that a center of gravity of the laser body can be effectively balanced, and the lidar body rotates more stably, thereby effectively ensuring precision of the lidar and extending a service life of the lidar.

The foregoing descriptions are brief descriptions of the technical solutions in the embodiments of the present disclosure. To understand the technical means in the embodiments of the present disclosure more clearly so that they may be carried out according to the content of the specification, and to make the foregoing and other objectives, features, and advantages of the embodiments of the present disclosure more apparent and understandable, specific implementations of the present disclosure are particularly given as follows.

BRIEF DESCRIPTION OF THE DRAWINGS

One or more embodiments are described by using examples with reference to diagrams in accompanying drawings corresponding to the embodiments. These example descriptions do not constitute a limitation on the embodiments. Elements with a same reference numerical sign indicate similar elements. Unless otherwise stated, the diagrams in the accompanying drawings do not constitute a proportional limitation.

DETAILED DESCRIPTION

The following describes example embodiments of the present disclosure in a more detailed manner with reference to accompanying drawings. Although the accompanying drawings show the example embodiments of the present disclosure, it should be understood that the present disclosure may be implemented in various forms and should not be limited to the embodiments described herein. On the contrary, these embodiments are provided for more thoroughly understanding the present disclosure and entirely transferring the scope of the present disclosure to persons skilled in the art.

The following describes embodiments of technical solutions of the present disclosure in detail with reference to the accompanying drawings. The following embodiments are only intended to describe the technical solutions of the present disclosure more clearly, and therefore are merely examples and cannot be construed as a limitation on the protection scope of the present disclosure.

Figure 1:
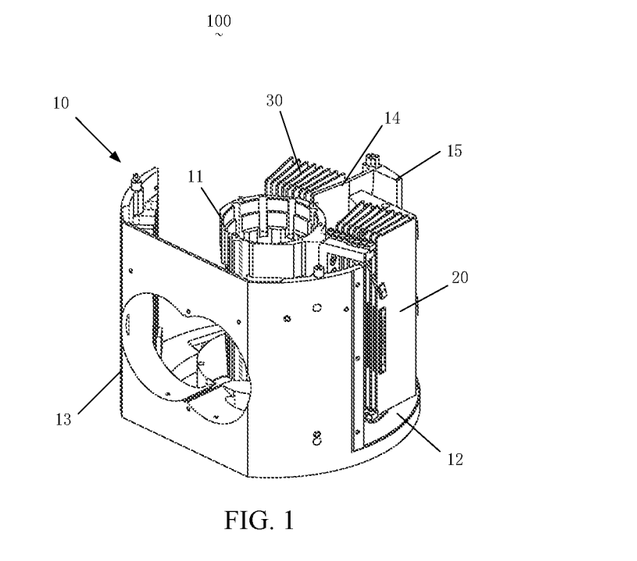
FIG. 1 is a schematic diagram of a lidar according to an embodiment of the present disclosure.

Referring to FIG. 1, a lidar 100 provided in an embodiment of the present disclosure includes a lidar body 10, a laser emitter board 20, and a laser receiver board 30. The laser emitter board 20 and the laser receiver board 30 are separately disposed on the laser body 10. The laser emitter board 20 is configured to emit an emergent laser toward a detection target. The laser receiver board 30 is configured to receive a reflected laser reflected by the detection target, and convert an optical signal into an electrical signal, so as to analyze a position, a three-dimensional image, a speed, and the like of the detection target. The lidar body 10 is connected to a power apparatus, and the power apparatus drives the entire lidar body 10 and the laser emitter board 20 and the laser receiver board 30 that are located on the lidar body 10 to rotate, so that the lidar 100 has a wider detection range and can detect a range of 360° around.

Figure 2:
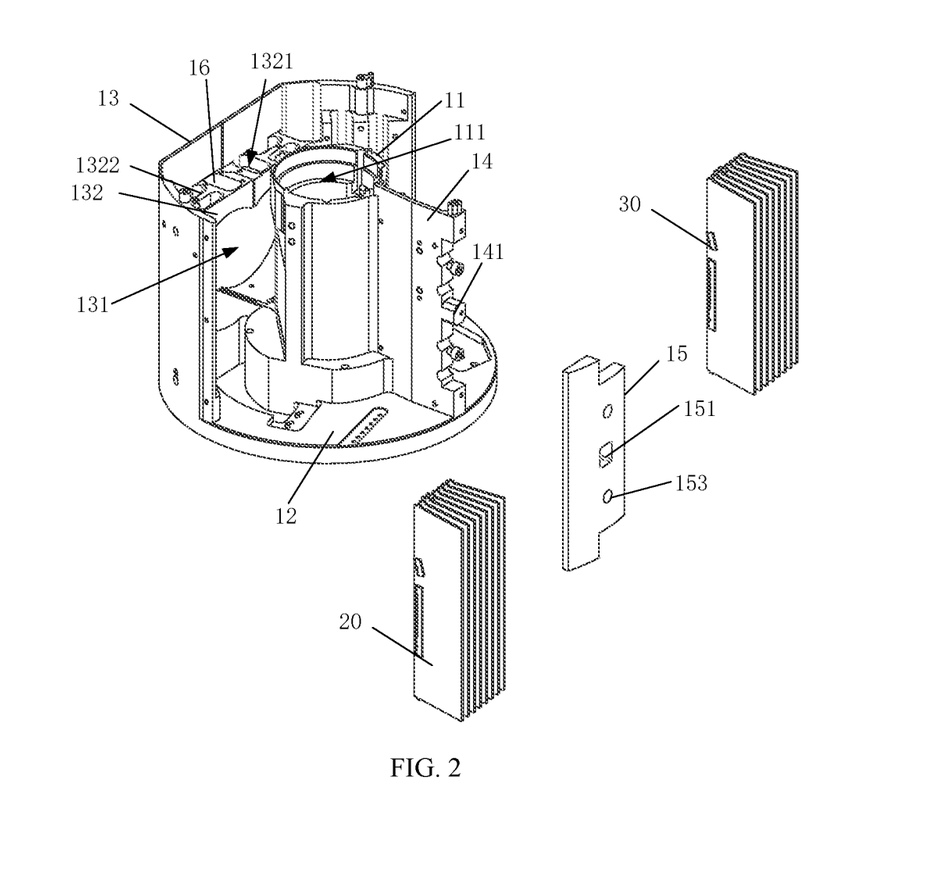
FIG. 2 is an exploded diagram of a lidar according to an embodiment of the present disclosure.

Referring to FIG. 2, the lidar body 10 includes an axis connecting portion 11 and a base plate 12. It can be understood that the base plate 12 of the lidar body may also be referred to as a base plate of the lidar body, that is, a supporting plate structure at the bottom of the lidar body that is configured to carry structures such as the laser emitter board, the laser receiver board, and a lens bracket. This is not repeated in the following embodiments. The base plate 12 is connected to the laser emitter board 20 and the laser receiver board 30. Optionally, the axis connecting portion 11 and the base plate 12 are integrated; or the axis connecting portion 11 and the base plate 12 are fixedly connected, and the axis connecting portion 11 is located at a center position of the base plate 12 and is perpendicular to the base plate 12. The axis connecting portion 11 is in a cylindrical shape. A fixing hole 111 for connecting the base plate 12 is provided at an end of the axis connecting portion 11 that is connected to the base plate 12. The fixing hole 111 is configured to connect a projecting shaft of the power apparatus. Specifically, the projecting shaft stretches into the fixing hole 111 from a side that is of the base plate 12 and that is away from the axis connecting portion 11, and is in interference fit with the fixing hole 111. Compared with other connection manners such as a threaded connection, this connection manner does not generate bending or torsion stress on the projecting shaft, and does not affect rotation precision of the projecting shaft. In addition, the interference fit can also improve concentricity between the axis connecting portion 11 and the projecting shaft, and ensure a dynamic balance during rotation of the lidar body 10. When the power apparatus starts, the projecting shaft of the power apparatus starts to rotate and drives the axis connecting portion 11 to rotate, so that the base plate 12, the laser emitter board 20, and the laser receiver board 30 are driven to rotate together, thereby realizing rotation of the entire lidar body 100. It can be understood that the base plate 12 is in a disc shape, and the axis connecting portion 11 and the base plate 12 may be integrated to improve their concentricity, so as to avoid radial run-out during rotation of the base plate 12 and further improve stability during rotation of the base plate 12.

It can be understood that a connection manner of the axis connecting portion 11 and the base plate 12 and shapes of the axis connecting portion 11 and the base plate 12 are not limited to the aforementioned manner and shapes, and may be alternatively other manners and shapes. Details are not described herein again.

In addition, the lidar body 10 further includes a lens bracket 13, a connecting vertical plate 14, and a counterweight piece 15. The lens bracket 13 and the connecting vertical plate 14 are separately connected to the base plate 12. The lens bracket 13 and the connecting vertical plate 14 are separately located on two sides of the axis connecting portion 11, and the connecting vertical plate 14 is located on a same plane as that of a symmetry axis between an emitter lens and a receiver lens of the lens bracket 13. The connecting vertical plate 14 may be integrated with the axis connecting portion 11 and the base plate 12. Optionally, the connecting vertical plate 14 may be alternatively fixedly connected to the axis connecting portion 11 and the base plate 12. A side that is of the connecting vertical plate 14 and that is opposite to the axis connecting portion 11 is connected to the counterweight piece 15, to fix the counterweight piece 15 at a position that is at an edge of the base plate 12 and opposite to the lens bracket 13. The lens bracket 13 is used for mounting the emitter lens and the receiver lens of the lidar 100. To ensure a dynamic balance during rotation of the lidar body 10, in this embodiment of the present disclosure, the counterweight piece 15 is disposed at a position that is on the lidar body 10 and opposite to the lens bracket 13, to achieve a front-rear balance of the lidar body 10, so that a center of gravity of the lidar body 10 can fall on the axis connecting portion 11. The connecting vertical plate 14 is used to fix the counterweight piece 15 at the position that is at the edge of the base and that is opposite to the lens bracket. In addition, the laser emitter board 20 and the laser receiver board 30 are separately disposed on two sides of the connecting vertical plate 14. It can be understood that, when a weight on a side of the laser emitter board 20 is equal to a weight on a side of the laser receiver board 30, a plumb line of the counterweight piece 15 is located at a junction between the counterweight piece 15 and the connecting vertical plate 14; or when a weight on a side of the laser emitter board 20 is not equal to a weight on a side of the laser receiver board 30, the counterweight piece 15 is connected to the connecting vertical plate 14, and a plumb line of the counterweight piece 15 tilts toward a side with a lighter weight. This disposing manner can further ensure left-right and front-rear balances of the lidar body, so that the lidar body 10 rotates more stably. In addition, the connecting vertical plate 14 is disposed between the laser emitter board 20 and the laser receiver board 30, so that the laser emitter board 20 and the laser receiver board 30 can be well isolated. This can effectively perform heat insulation and avoid optical crosstalk, and can make the laser emitter board 20 and the laser receiver board independent of each other, without affecting each other.

It can be understood that a manner of connecting the connecting vertical plate 14 to the axis connecting portion 11 and the base plate 12 is not limited to the aforementioned manner, and may be alternatively another manner. For example, the connecting vertical plate 14 is integrated or welded only with the axis connecting portion 11, or the connecting vertical plate 14 is integrated or welded only with the base plate 12, or the connecting vertical plate 14 may be fixedly connected to the axis connecting portion 11 and the base plate 12. A manner of the fixed connection may be, for example, a connection using a fastener or a clamping connection.

For the lens bracket 13, still referring to FIG. 2, an accommodation hole 131 and a crossbeam 132 are provided on the lens bracket 13. The accommodation hole 131 is configured to accommodate the emitter lens and the receiver lens of the lidar 100. The crossbeam 132 is configured to reinforce the lens bracket 13, so that the lens bracket 13 is more stable.

In some embodiments, the emitter lens and the receiver lens may be excessively heavy, but the counterweight piece 15 has a limited weight and cannot well counteract weights of the emitter lens and the receiver lens. In this case, a weight of the lens bracket 13 in the lidar body 10 may be alternatively reduced to implement a dynamic balance of the lidar body 10. Specifically, a first weight reduction slot 1321 may be provided on the crossbeam 132 of the lens bracket 13 to remove some materials of the crossbeam 132, so as to achieve an effect of weight reduction. However, if the crossbeam 132 is excessively thin, the crossbeam 132 is likely to bend or break. Therefore, several first reinforcing ribs 1322 further need to be disposed in the first weight reduction slot 1321, to ensure strength of the crossbeam 132.

Figure 3:
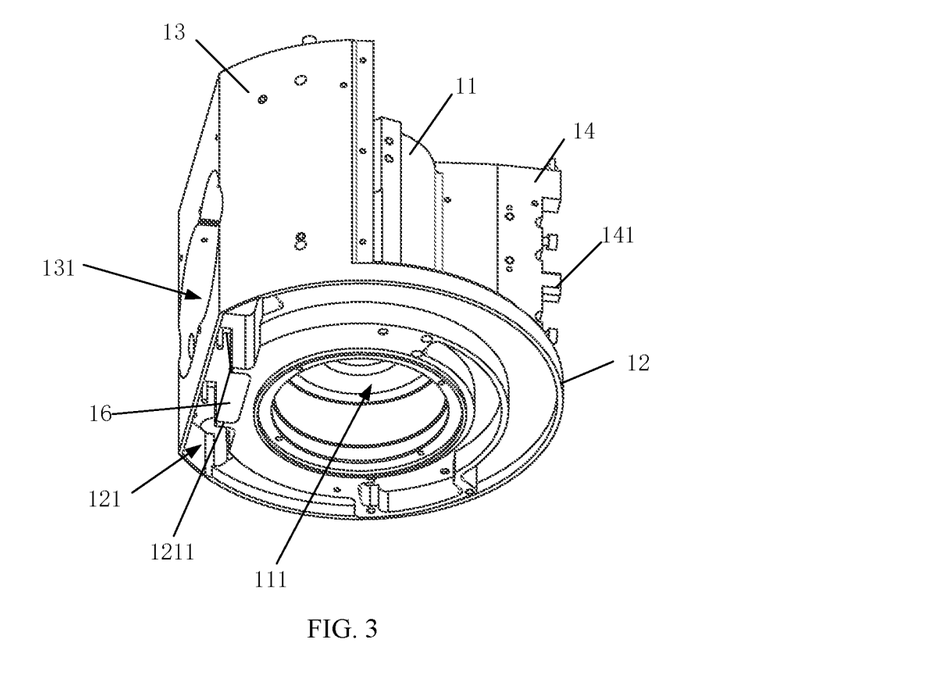
FIG. 3 is a schematic diagram of a lidar body in a lidar according to an embodiment of the present disclosure.

Further, some materials may be removed from a position that is at the bottom of the base plate 12 and that is away from the lens bracket 13, to achieve an objective of reducing a weight on a side that is of the lidar body 10 and on which the lens bracket 13 is disposed. Specifically, as shown in FIG. 3, a second weight reduction slot 121 may be alternatively provided at a position that is at the bottom of the base plate 12 and that is away from the lens bracket 13, to achieve an effect of weight reduction. Likewise, to ensure strength of the base plate 12, several second reinforcing ribs 1211 also need to be added in the second weight reduction slot 121.

The first weight reduction slots 1321 may be evenly distributed on the crossbeam 132 vertically and horizontally. As shown in FIG. 2, gaps between two horizontally arranged first weight reduction slots 1321 and a vertically arranged first weight reduction slot 1321 form a T-shaped first reinforcing rib 1322, to reinforce the crossbeam 132. It can be understood that shapes and sizes of the first weight reduction slots 1321 may be the same or different. Preferably, in this embodiment, the first weight reduction slots 1321 may be in elliptic shapes with a same size and a same shape. This better facilitates symmetric processing and can make processing more convenient. In addition, in this embodiment, the second weight reduction slots 121 are several slots with different depths. Because a thickness of the base plate 12 is non-uniform, a comparatively deep second weight reduction slot 121 may be provided at a comparatively thick position of the base plate 12, and a comparatively shallow second weight reduction slot 121 may be provided at a comparatively thin position of the base plate 12. It can be understood that sizes, depths, and shapes of the second weight reduction slots 121 may be the same or different. Details are not described herein again. Usually, to make weights on two sides of the lens be equal, preferably, the weight reduction slots are distributed at positions on two sides of an axis of the two lens in a same manner. That is, at symmetric positions on the two sides of the two lens, sizes, shapes, and depths of the first weight reduction slots 1321 and the second weight reduction slots 121 are the same. The first weight reduction slots 1321 and the second weight reduction slots 121 are uniformly arranged according to a rule, for example, are arranged by column or by row. The uniform arrangement facilitates symmetric processing and makes processing more convenient. In addition, shapes of the first weight reduction slot 1321 and the second weight reduction slot 121 may also be adjusted according to a requirement. Preferably, an elliptic structure is used in this embodiment of the present disclosure. This can facilitate symmetric processing.

It can be understood that disposing the first weight reduction slot 1321 and the second weight reduction slot 121 can reduce an overall weight of a rotator and reduce energy consumption. Further, in some embodiments, still referring to FIG. 2 and FIG. 3, the lidar body 10 further includes at least one first secondary counterweight piece 16. The first secondary counterweight piece 16 may be bonded or clamped in the first weight reduction slot 1321 or the second weight reduction slot 121. Alternatively, the first secondary counterweight piece 16 is bonded or clamped in each of the first weight reduction slot 1321 and the second weight reduction slot 121, to achieve a front-rear balance of the lidar body 10. Preferably, a shape of the first secondary counterweight piece 16 adapts to the first weight reduction slot 1321 and the second weight reduction slot 121. A plurality of shapes may be used. For example, any shape of an elliptic shape, a rectangular shape, and a wedge shape that adapts to the first weight reduction slot 1321 and the second weight reduction slot 121 may be selected for the first secondary counterweight piece 16. In this embodiment of the present disclosure, the first secondary counterweight piece 16 is added, so that when the counterweight piece 15 has a specific weight, the weight on the side that is of the lidar body 10 and on which the lens bracket 13 is disposed can be adjusted, thereby improving flexibility of overall dynamic balance adjustment of the lidar body 10, and having stronger practicability. In addition, the first secondary counterweight piece 16 can also be used to adjust a weight difference resulting from a requirement for symmetric processing of the first weight reduction slot 1321 and the second weight reduction slot 121, thereby simplifying a processing process.

For the connecting vertical plate 14 and the counterweight piece 15, still referring to FIG. 2, a positioning boss 141 is disposed on the connecting vertical plate 14, and a positioning hole 151 is provided on the counterweight piece 15. In a process of fixing the connecting vertical plate 14 and the counterweight piece 15, the positioning hole 151 of the counterweight piece 15 may be first buckled to the positioning boss 141, to implement preliminary positioning for the counterweight piece 15. In this case, a mounting hole 153 on the counterweight piece 15 is aligned with a threaded hole on the connecting vertical plate 14. Then a screw is led through the mounting hole 153 and tightened into the threaded hole, to fix the connecting vertical plate 14 and the counterweight piece 15. The positioning boss 141 and the positioning hole 151 can simplify a process of mounting the connecting vertical plate 14 and the counterweight piece 15, thereby reducing time for aligning with the threaded hole and reducing assembly time. In addition, a surface on a side that is of the counterweight piece 15 and that is away from the connecting vertical plate 14 is of an arc structure, and adapts to a disc structure of the base plate 12, so that the lidar 100 has better appearance.

It can be understood that a connection manner of the connecting vertical plate 14 and the counterweight piece 15 and a surface shape of the counterweight piece 15 are not limited to the aforementioned manner and shape, and may be alternatively other manners and shapes. For example, the connecting vertical plate 14 and the counterweight piece 15 may be alternatively connected through clamping or bonding. A shape of the counterweight piece may be another shape that adapts to the base. Details are not described herein again.

Figure 4:
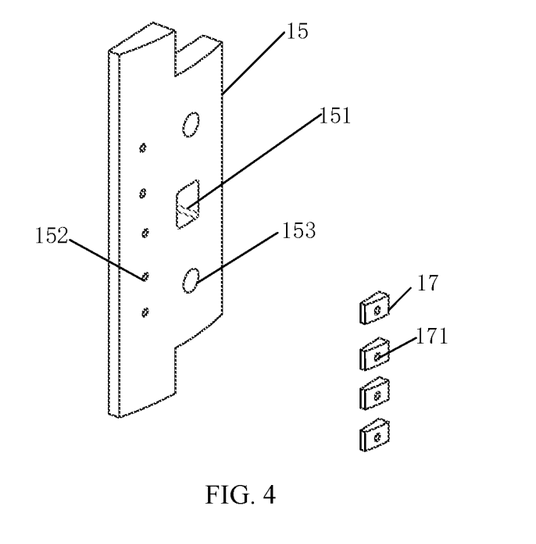
FIG. 4 is a schematic diagram of a counterweight piece and a second secondary counterweight piece in a lidar according to an embodiment of the present disclosure.

In some other embodiments, as shown in FIG. 4, the lidar body 10 further includes at least one second secondary counterweight piece 17, a same quantity of connecting holes 152 are provided on the counterweight piece 15 and the second secondary counterweight piece 17, and a through-hole 171 used for connecting is provided on each second secondary counterweight piece 17. A screw may be led through the connecting hole 152 and the through-hole 171, and then two ends of the screw may be tightened by using bolts, to connect the second secondary counterweight piece 17 and the counterweight piece 15. With the second secondary counterweight piece 17, when a weight of the counterweight piece 15 is insufficient, second secondary counterweight pieces 17 may be gradually added on the counterweight piece 15 to gradually increase the weight of the counterweight piece 15, thereby making the weight of the counterweight piece 15 adjustable and improving practicability of the counterweight piece 15.

It can be understood that a connection manner of the second secondary counterweight piece 17 and the counterweight piece 15 is not limited to the aforementioned manner, and may be alternatively other manners, for example, bonding or a combination of bonding and another fastening manner.

Different from a case in the prior art, in this embodiment of the present disclosure, the lidar body 10 includes the axis connecting portion 11, the base plate 12, the lens bracket 13, the connecting vertical plate 14, and the counterweight piece 15. The axis connecting portion 11 is configured to connect a drive apparatus, to drive the entire lidar 100 to rotate. The lens bracket 13 is disposed on a side of the axis connecting portion 11. The lens bracket 13 is used for mounting the emitter lens and the receiver lens of the lidar 100. The emitter lens and the receiver lens are comparatively heavy. As a result, the center of gravity of the lidar 10 deviates from a center position, thereby affecting a dynamic balance during rotation of the lidar body 10. Therefore, in this embodiment of the present disclosure, the counterweight piece 15 is disposed, by using the connecting vertical plate 14, on the other side opposite to the lens bracket 13, and the counterweight piece 15 is disposed at a position that is at an edge of the base and that is opposite to the lens bracket, and is also disposed between the laser emitter board 20 and the laser receiver board 30. The connecting vertical plate 14 and the counterweight piece 15 can effectively balance the lidar body 10 so that the lidar body 10 rotates more stably, and can also better isolate the laser emitter board 20 and the laser receiver board 30 to prevent them from affecting each other. In addition, in this embodiment of the present disclosure, the first secondary counterweight piece 16 and the second secondary counterweight piece 17 are added, so that weights of the counterweight piece 15 and the side that is of the lidar body 10 and on which the lens bracket 13 is disposed are adjustable, and the counterweight solution provided in this embodiment of the present disclosure is more practicable.

Figure 5:
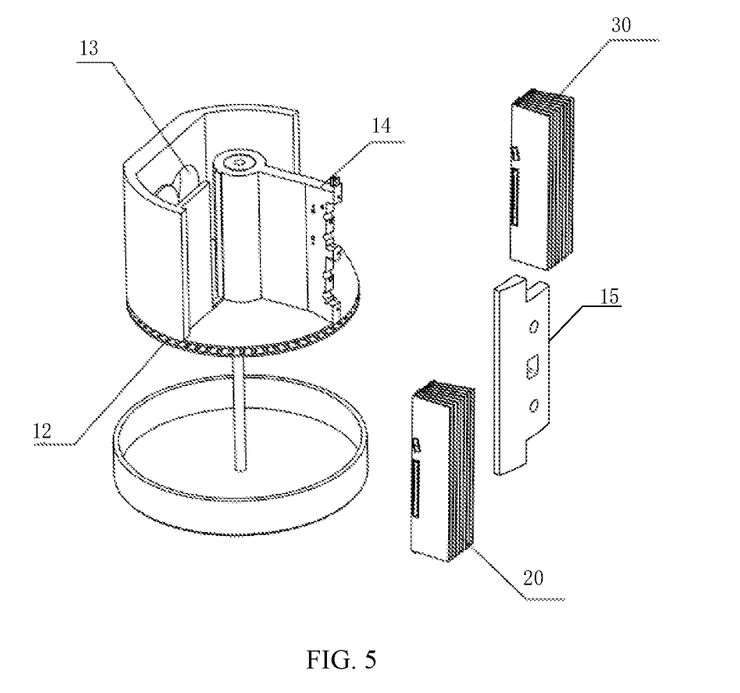
FIG. 5 is a schematic diagram of another lidar according to an embodiment of the present disclosure.

Furthermore, as shown in FIG. 5, in another optional embodiment of the present disclosure, the lidar body further includes a first counterweight slot. The first counterweight slot is provided at an edge of the base plate 12, and is in a ring shape around the base plate 12. The first counterweight slot includes a lower edge. At least one first fixing hole is provided at the lower edge. The first fixing hole enables a first counterweight block to be adjusted along a peripheral direction of the base plate and toward an axis of the center shaft, and fixes the first counterweight block at any position of the first fixing hole. It can be understood that, with the counterweight slot provided on the base plate, on the one hand, when counterweight adjustment is not performed by using the base plate, a weight of the rotator can be reduced; on the other hand, when counterweight adjustment is performed by using the base plate, the counterweight block can be conveniently disposed in any direction and at any position of the base plate of the rotator, to implement dynamic balance adjustment of the lidar. In addition, disposing the counterweight block on the base plate can further lower the center of gravity during rotation of the lidar body, thereby reducing an offset resulting from a deviation of the center of gravity, and increasing a service life of the device.

Optionally, the first fixing hole may be shown in FIG. 8A, FIG. 8B, FIG. 8C, FIG. 8D, FIG. 8E, and FIG. 8F. First fixing holes may be closely provided around the base plate 12, and may have a plurality of shapes.

Figure 8A:
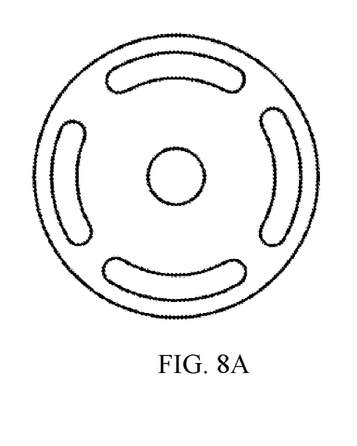
FIG. 8A is a structural diagram of a first fixing hole according to an embodiment of the present disclosure.
Figure 8B:
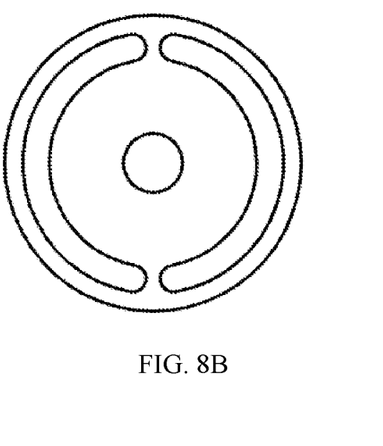
FIG. 8B is a structural diagram of a second fixing hole according to an embodiment of the present disclosure.
Figure 8C:
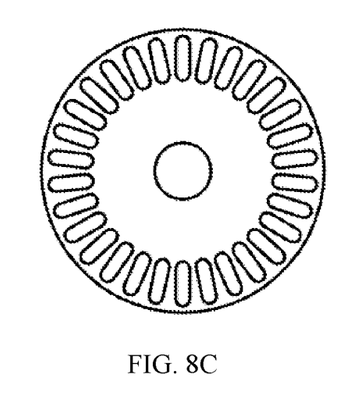
FIG. 8C is a structural diagram of a third fixing hole according to an embodiment of the present disclosure.

Preferably, the first fixing hole is provided in a long circular shape toward an axis of the lidar body 10, as shown in FIG. 8C. In this way, when a counterweight block is fixed to the counterweight tray, a position of the counterweight block can be conveniently adjusted. For example, the counterweight block may be moved toward the axis, to adjust a distance between the counterweight block and the axis of the lidar body. In this way, the center of gravity of lidar body can be more conveniently adjusted without adding counterweight.

Optionally, the fixing holes may be alternatively provided in a ring shape along the peripheral direction of the base plate, for example, along a peripheral direction of the counterweight tray, as shown in FIG. 8A and FIG. 8B. In FIG. 8A, four long ring shapes are provided. In this way, a counterweight block can move along the peripheral direction of the base plate. In each adjustment, the center of gravity can be adjusted without removing the counterweight block. Certainly, two long ring shapes may be alternatively provided, as shown in FIG. 8B. This maximally eliminates a gap between fixing holes, so that a counterweight block can be disposed and fixed at any position, thereby improving convenience of adjustment.

Figure 8D:
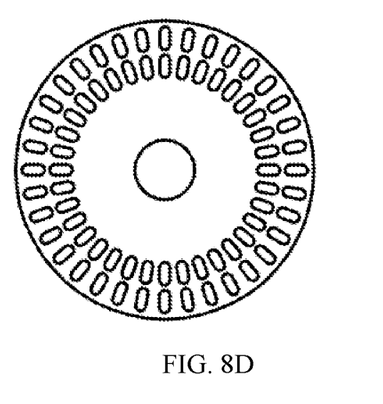
FIG. 8D is a structural diagram of a fourth fixing hole according to an embodiment of the present disclosure.

Optionally, as shown in FIG. 8D, the fixing holes may be alternatively provided around the axis of the base plate for two circles. This can increase an adjustment range for a counterweight block and improve convenience of dynamic balance adjustment.

Figure 8E:
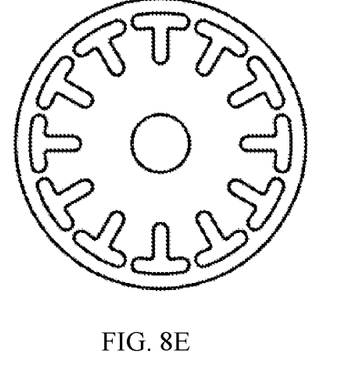
FIG. 8E is a structural diagram of a fifth fixing hole according to an embodiment of the present disclosure.
Figure 8F:
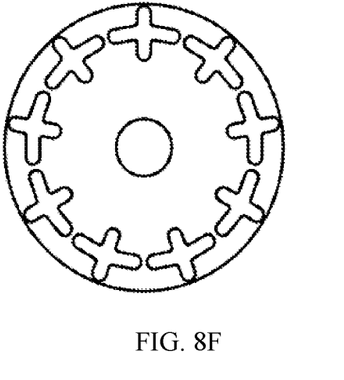
FIG. 8F is a structural diagram of a sixth fixing hole according to an embodiment of the present disclosure.

Optionally, as shown in FIG. 8E or FIG. 8F, the fixing holes may be alternatively provided in a T shape or cross shape. In this way, a fixing block can be conveniently moved front and back or left and right, that is, a position of the fixing block is slightly adjusted in a plurality of directions, thereby improving convenience of dynamic balance adjustment. It can be understood that, in some possible embodiments, the fixing holes may be provided in a plurality of shapes that enable slight adjustment in a plurality of directions, for example, in the shape of the gān character (干) or the fēng character (丰), thereby further improving convenience of dynamic balance adjustment.

It can be understood that a specific fixing hole may be alternatively in another shape, which is not limited herein. A purpose is to better fix the fixing block and slightly adjust the position of the fixing block. In addition, an arrangement manner and arrangement density of the fixing holes may also be adjusted according to a requirement. The fixing holes may be uniformly distributed, or distribution density may be adjusted according to a requirement. In the foregoing embodiments, the fixing hole is provided in the counterweight slot, and the counterweight block slides in the fixing hole along the peripheral direction of the base plate or toward the axis of the center shaft, so that the position of the first counterweight block can be conveniently adjusted. The first counterweight block may move along the peripheral direction or toward the axis, so that dynamic balance adjustment is very convenient. In addition, adjustment toward the axis makes a dynamic balance adjustment effect more significant.

Figure 9:
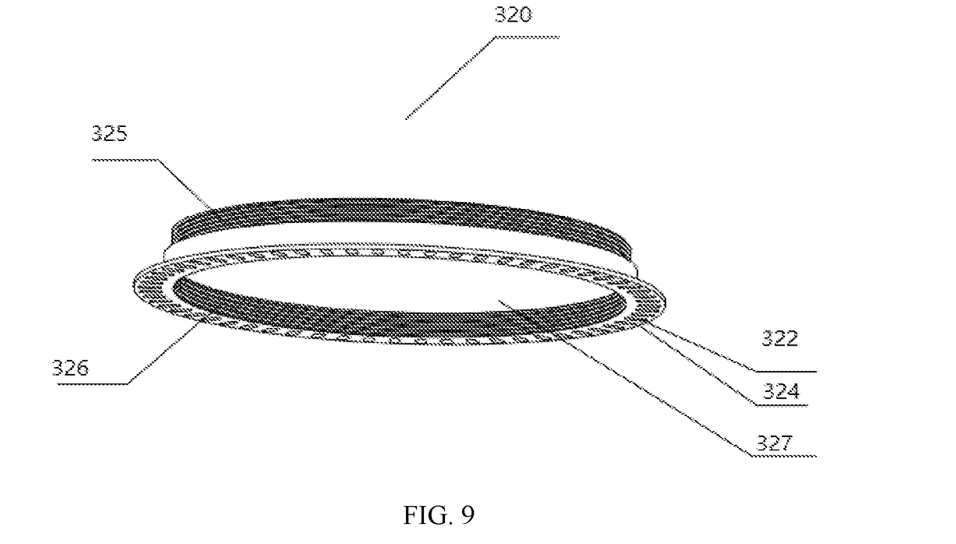
FIG. 9 is a schematic structural diagram of a counterweight tray according to an embodiment of the present disclosure.

Optionally, in another embodiment of the present disclosure, as shown in FIG. 9, the lidar body further includes a first counterweight tray (320). The first counterweight tray (320) is disposed at the bottom of the base plate 12. A second counterweight slot is formed at an edge of the base plate 12. The second counterweight slot is in a ring shape around the base plate 12. The counterweight tray (320) includes a second counterweight edge (324). At least one third fixing hole (322) is provided at the second counterweight edge (324). The third fixing hole (322) enables a second counterweight block (323) to be adjusted along a peripheral direction of the base plate (310) and toward an axis of the center shaft (401), and fixes the second counterweight block (323) at any position of the third fixing hole (322).

Preferably, the first counterweight tray (320) is hollow, and includes an outer screw thread (325), and the first counterweight tray (320) is fixed to an inner screw thread of the base plate 12 through the outer screw thread (325).

Optionally, the lidar body has a top cover. In this case, the first counterweight tray 320 may alternatively form a counterweight slot around the top cover, to fix the counterweight block at any position around a top plate of the lidar.

In this embodiment of the present disclosure, the first counterweight tray 320 is disposed on the base plate 12 of the lidar body 10 to form the counterweight slot, so that the counterweight block can be conveniently disposed in any direction and at any position of the base plate and/or the top plate to implement dynamic balance adjustment of the lidar, thereby implementing omnidirectional weight adjustment of the base plate and/or the top plate of the lidar body, and achieving a better effect of dynamic balance adjustment of the lidar.

Figure 10:
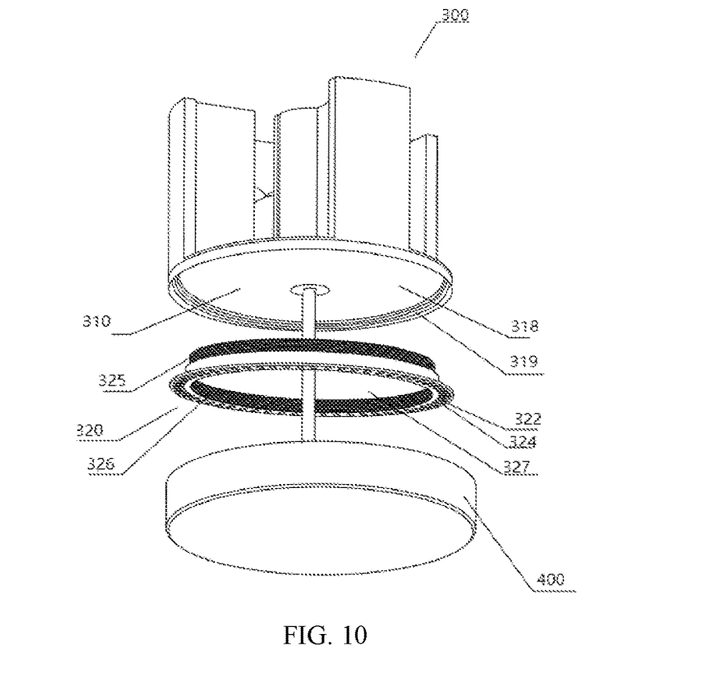
FIG. 10 is a schematic structural diagram of another lidar according to an embodiment of the present disclosure.

The first counterweight tray 320 and the base plate may be fixed in a plurality of manners, preferably, through screw threads. As shown in FIG. 10, a cavity 318 is provided at the bottom of the base plate 310, an inner screw thread 319 is provided in the cavity, an outer screw thread 325 is provided on the first counterweight tray 320, and the first counterweight tray and the base plate are fixed through the inner screw thread and the outer screw thread. Preferably, a cavity is formed at the bottom of the base plate 310, so that a weight of the base plate 310 can be reduced. It can be understood that the base plate 310 and the first counterweight tray 320 may be alternatively fixed in another manner, for example, by using a screw or through bonding or clamping.

It can be understood that, in some optional embodiments, the first counterweight tray may include a clearance hole, and the first counterweight tray is sleeved on the rotating shaft through the clearance hole, and is fixed at the bottom of the base plate by using a screw.

Figure 12:
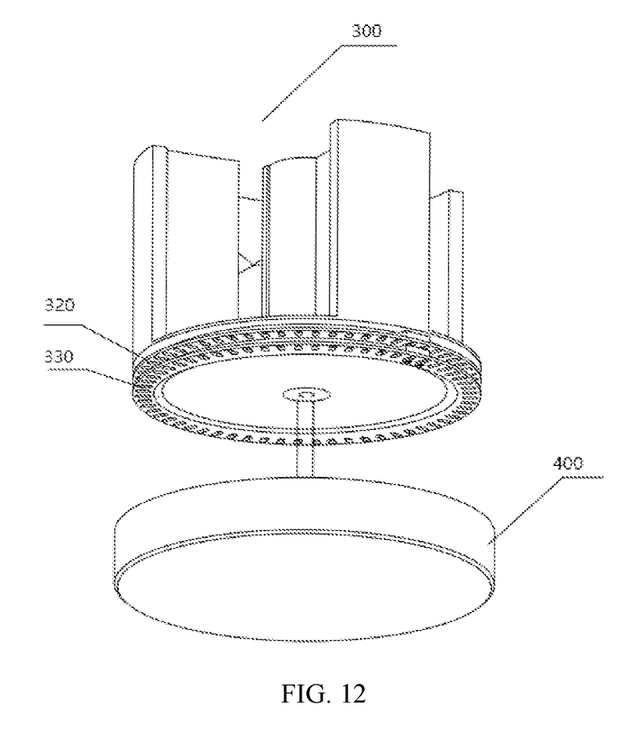
FIG. 12 is a schematic structural diagram of another lidar according to an embodiment of the present disclosure.

Further, as shown in FIG. 12, the lidar may further include a second counterweight tray 330, the second counterweight tray 330 includes an inner screw thread, an outer screw thread, and a counterweight edge, the second counterweight tray 330 is fixed to the inner screw thread of the first counterweight tray through the outer screw thread, and the counterweight edge is configured to fix the second counterweight block.

With the counterweight tray and the lidar in this embodiment of the present disclosure, the counterweight tray can be conveniently mounted on the base plate of the lidar body, and the counterweight block is mounted according to a requirement, to implement dynamic balance adjustment at various angles at the edge of the base plate. In addition, in this embodiment of the present disclosure, a plurality of counterweight trays may be conveniently mounted according to a requirement. The plurality of counterweight trays are combined through screw threads, and can adapt to each other. A plurality of counterweight blocks may be configured in a same direction, thereby enhancing dynamic balance adjustment.

Furthermore, based on the lidar 100, an embodiment of the present disclosure proposes an intelligent sensing device that includes the lidar 100 in the foregoing embodiment. The intelligent sensing device may be a car, an unmanned aerial vehicle, a robot, or another device relating to intelligent sensing and detection by using the lidar 100.

Figure 6:
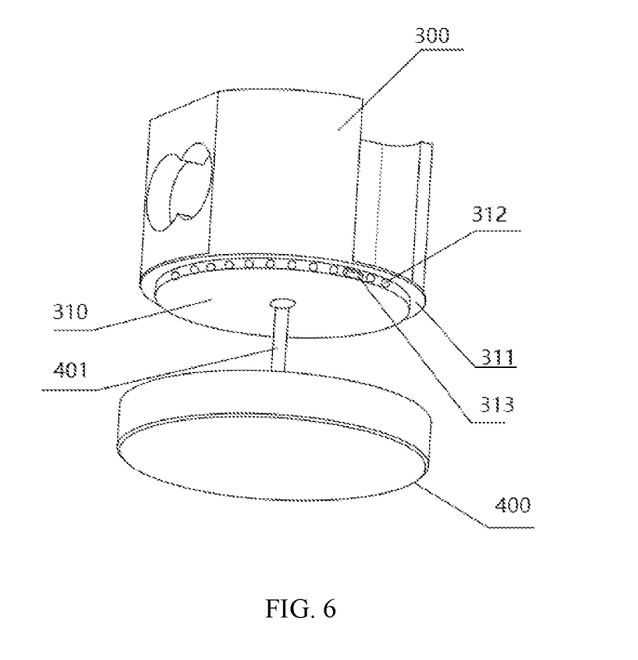
FIG. 6 is a schematic structural diagram of another lidar according to an embodiment of the present disclosure.

Referring to FIG. 6, an embodiment of the present disclosure proposes a lidar, including a lidar body 300 and a lidar base 400. A center shaft 401 is disposed on the lidar base 400, and the lidar body 300 is sleeved on the center shaft 401. The lidar body 300 includes a base plate 310 and a first counterweight slot 311. The first counterweight slot 311 is provided at an edge of the base plate 310, is in a ring shape around the base plate, and is sunk toward an axis of the center shaft 401. The first counterweight slot 311 is configured to accommodate a first counterweight block 313. The lidar body 300 may rotate relative to the lidar base 400. In this embodiment of the present disclosure the first counterweight slot 311 is formed through shrinkage from the edge at the bottom of the base plate 310 to the axis of the center shaft 401, and the first counterweight slot 311 is of an L-shaped structure. The first counterweight slot 311 is provided around the edge at the bottom of the base plate 310, so that a counterweight block can be freely fixed at any position of the base plate 310, thereby facilitating dynamic balance adjustment of the lidar. In addition, the first counterweight block 313 is accommodated in the first counterweight slot 311, so that the counterweight block does not extrude out of the lidar body 300, and the counterweight block is not in contact with a housing of the lidar when the lidar body 300 rotates relative to the lidar base 400.

It can be understood that the counterweight slot is provided on the base plate of the lidar body, and the counterweight slot may be provided along a peripheral direction of the base plate of the lidar body, so that the counterweight block can be conveniently disposed in any direction and at any position to implement dynamic balance adjustment of the lidar. In addition, disposing the counterweight block on the base plate can further lower the center of gravity during rotation of the lidar body, thereby reducing an offset resulting from a deviation of the center of gravity, and increasing a service life of the device.

It can be understood that the counterweight slot is provided on the base plate of the lidar body, and the counterweight slot may be provided along a peripheral direction of the base plate of the lidar body, so that the counterweight block can be conveniently disposed in any direction and at any position to implement dynamic balance adjustment of the lidar. In addition, disposing the counterweight block on the base plate can further lower the center of gravity during rotation of the lidar body, thereby reducing an offset resulting from a deviation of the center of gravity, and increasing a service life of the device.

It can be understood that, in some embodiments, the lidar body may further include a top cover, and the first counterweight slot 311 may be provided on the top cover of the lidar body 300. The first counterweight slot is provided around the top cover, and the first counterweight block may be fixed in the first counterweight slot by using a screw. It can be understood that the first counterweight block may be alternatively fixed in the first counterweight slot through bonding, clamping, or the like.

It can be understood that, in some embodiments, a counterweight slot may be provided on each of the base plate and a top plate of the lidar body, to flexibly adjust a fixing position and a fixing quantity of first counterweight blocks, and achieve a better effect of dynamic balance adjustment of the lidar.

In an actual use process, the lidar body is rotating at a high speed. In this embodiment of the present disclosure, the counterweight slot is provided at an edge of the base plate or the top plate the lidar body, so that the counterweight block can be conveniently disposed in any direction and at any position of the base plate and/or the top plate to implement dynamic balance adjustment of the lidar, thereby implementing omnidirectional weight adjustment of the base plate and/or the top plate of the lidar body, and achieving a better effect of dynamic balance adjustment of the lidar.

Figure 7:
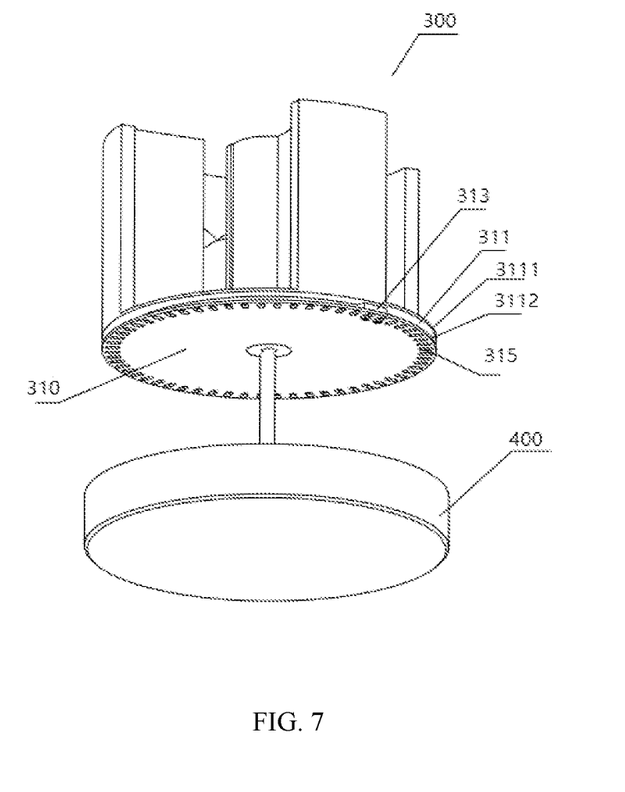
FIG. 7 is a schematic structural diagram of another lidar according to an embodiment of the present disclosure.

Another embodiment of the present disclosure further provides another lidar. As shown in FIG. 7, in this embodiment, the first counterweight slot 311 includes an upper edge 3111 and a lower edge 3112, the upper edge 3111 and the lower edge 3112 form a U-shaped first counterweight slot 311, the lower edge 3112 is an edge at a side away from the base plate 310, the U-shaped first counterweight slot 311 is in a ring shape around the base plate 310, at least one first fixing hole 315 is provided at the lower edge 3112, and the first counterweight block 313 is disposed in the counterweight slot through the first fixing hole 315. In this manner, the first counterweight block 313 can be conveniently fixed, and the first fixing hole 315 is provided at any position around the base plate 310, thereby improving convenience of dynamic balance adjustment of the lidar.

Certainly, for fixing the first counterweight block 313, second fixing holes 312 may be provided around an inner side of an L-shaped first counterweight slot 311, and the first counterweight block 313 is fixed to an inner wall of the first counterweight slot 311 through threaded connection. It can be understood that the first counterweight block may be alternatively fixed in the first counterweight slot through bonding, clamping, or the like.

Optionally, the first counterweight block may slide relative to the first fixing hole 315, and the first fixing hole 315 may enable the first counterweight block 313 to be adjusted along a peripheral direction of the base plate 310 and/or toward an axis of the center shaft 401, and fix the first counterweight block 313 at any position of the first fixing hole 315. The first fixing hole 315 may be shown in FIG. 8A, FIG. 8B, FIG. 8C, FIG. 8D, FIG. 8E, and FIG. 8F. First fixing holes may be closely provided around the base plate, and may have a plurality of shapes.

Preferably, the first fixing hole 315 is provided in a long circular shape toward an axis of the lidar body 300, as shown in FIG. 8C. In this way, when a counterweight block is fixed to the counterweight tray, a position of the counterweight block can be conveniently adjusted. For example, the counterweight block may be moved toward the axis, to adjust a distance between the counterweight block and the axis of the lidar body. In this way, the center of gravity lidar body can be more conveniently adjusted without adding counterweight.

Optionally, the fixing holes may be alternatively provided in a ring shape along the peripheral direction of the base plate, for example, along a peripheral direction of the counterweight tray, as shown in FIG. 8A and FIG. 8B. In FIG. 8A, four long ring shapes are provided. In this way, a counterweight block can move along the peripheral direction of the base plate. In each adjustment, the center of gravity can be adjusted without removing the counterweight block. Certainly, two long ring shapes may be alternatively provided, as shown in FIG. 8B. This maximally eliminates a gap between fixing holes, so that a counterweight block can be disposed and fixed at any position, thereby improving convenience of adjustment.

Optionally, as shown in FIG. 8D, the fixing holes may be alternatively provided around the axis of the base plate for two circles. This can increase an adjustment range for a counterweight block and improve convenience of dynamic balance adjustment.

Optionally, as shown in FIG. 8E or FIG. 8F, the fixing holes may be alternatively provided in a T shape or cross shape. In this way, a fixing block can be conveniently moved front and back or left and right, that is, a position of the fixing block is slightly adjusted in a plurality of directions, thereby improving convenience of dynamic balance adjustment. It can be understood that, in some possible embodiments, the fixing holes may be provided in a plurality of shapes that enable slight adjustment in a plurality of directions, for example, in the shape of the gān character ($\mp$) or the fēng character ($\equiv$), thereby further improving convenience of dynamic balance adjustment.

It can be understood that a specific fixing hole may be alternatively in another shape, which is not limited herein. A purpose is to better fix the fixing block and slightly adjust the position of the fixing block. In addition, an arrangement manner and arrangement density of the fixing holes may also be adjusted according to a requirement. The fixing holes may be uniformly distributed, or distribution density may be adjusted according to a requirement. In the foregoing embodiments, the fixing hole is provided in the counterweight slot, and the counterweight block slides in the fixing hole along the peripheral direction of the base plate or toward the axis of the center shaft, so that the position of the first counterweight block can be conveniently adjusted. The first counterweight block may move along the peripheral direction or toward the axis, so that dynamic balance adjustment is very convenient. In addition, adjustment toward the axis makes a dynamic balance adjustment effect more significant.

Another embodiment of the present disclosure proposes a counterweight tray 320. The counterweight tray includes a fixing edge, a counterweight edge, and a fixing hole. The counterweight tray is fixed to a lidar through the fixing edge. The counterweight edge can be fixed on a base plate of the lidar, and form a counterweight slot together with the base plate of the lidar body, to fix a counterweight block. Specifically, this embodiment of the present disclosure provides the counterweight tray, which is preferably fixed to the base plate of the lidar through threads. As shown in FIG. 9, the counterweight tray is hollow, forming an accommodation space 327, and includes an inner screw thread 326, an outer screw thread 325, a counterweight edge 324, and a third fixing hole 322. The counterweight tray is fixed to the base plate of the lidar through the outer screw thread 325, is fixed to another counterweight tray through the inner screw thread 326, and fixes a counterweight block through the third fixing hole 322. The third fixing hole 322 enables the counterweight block to slide along a peripheral direction of the base plate and toward an axis of the center shaft, and fixes the counterweight block at any position of the third fixing hole 322. The counterweight tray is a standard component, and counterweight trays may be directly fixed to each other.

In some optional embodiments, based on the lidar provided in FIG. 6 and FIG. 7, the counterweight tray shown in FIG. 4 may be fixed at the bottom of the base plate 310, to form a plurality of counterweight slots, and a plurality of fixing blocks may be fixed in a same direction. A specific fixing manner may be fixing through threaded connection, screw connection, bonding, or clamping. This is not uniquely limited herein.

The counterweight tray structure is added based on the original counterweight slot structure of the base plate, so that multi-layer dynamic balance adjustment can be implemented at one position, thereby improving convenience of dynamic balance adjustment.

Figure 11:
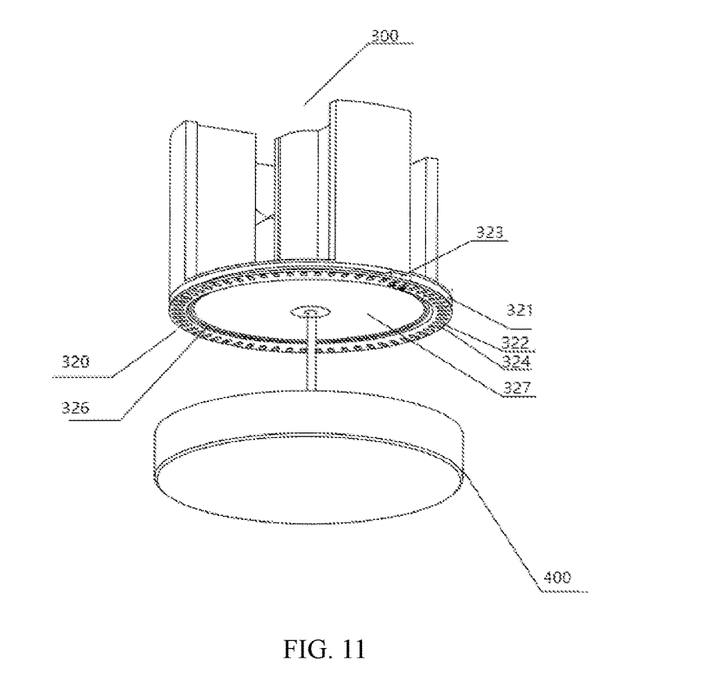
FIG. 11 is an assembly diagram of another lidar according to an embodiment of the present disclosure.

In FIG. 10 and FIG. 11, another embodiment of the present disclosure proposes a lidar. A center shaft 401 is disposed on the lidar base 400, and the lidar body 300 is sleeved on the center shaft 401.

The lidar body 300 includes a base plate 310 and a first counterweight tray 320. The first counterweight tray 320 is disposed at the bottom of the base plate 310. A second counterweight slot 321 is formed at an edge of the base plate. The second counterweight slot 321 is in a ring shape around the base plate 310. The second counterweight slot 321 is configured to accommodate a second counterweight block 323.

The lidar body 300 may rotate relative to the lidar base 400.

Optionally, the lidar body 300 has a top cover. In this case, the first counterweight tray 320 may alternatively form a counterweight slot around the top cover, to fix the counterweight block at any position around a top plate of the lidar.

In this embodiment of the present disclosure, the first counterweight tray 320 is disposed on the base plate 310 of the lidar body 300 to form the counterweight slot, so that the counterweight block can be conveniently disposed in any direction and at any position of the base plate and/or the top plate to implement dynamic balance adjustment of the lidar, thereby implementing omnidirectional weight adjustment of the base plate and/or the top plate of the lidar body, and achieving a better effect of dynamic balance adjustment of the lidar.

The first counterweight tray 320 and the base plate 310 may be fixed in a plurality of manners, preferably, through screw threads. As shown in FIG. 5, a cavity 318 is provided at the bottom of the base plate 310, an inner screw thread 319 is provided in the cavity, an outer screw thread 325 is provided on the first counterweight tray 320, and the first counterweight tray and the base plate are fixed through the inner screw thread and the outer screw thread. Preferably, a cavity is formed at the bottom of the base plate 310, so that a weight of the base plate 310 can be reduced. It can be understood that the base plate 310 and the first counterweight tray 320 may be alternatively fixed in another manner, for example, by using a screw or through bonding or clamping.

It can be understood that, in some optional embodiments, the first counterweight tray 320 may include a clearance hole, and the first counterweight tray 320 is sleeved on the rotating shaft through the clearance hole, and is fixed at the bottom of the base plate 310 by using a screw.

Further, as shown in FIG. 11 and FIG. 12, the lidar may further include a second counterweight tray 330, the second counterweight tray 330 includes an inner screw thread 326, an outer screw thread 325, and a counterweight edge 324, the second counterweight tray 330 is fixed to the inner screw thread 326 of the first counterweight tray 320 through the outer screw thread 325, and the counterweight edge 324 is configured to fix the second counterweight block 323.

It can be understood that, in some optional embodiments, the second counterweight tray 330 may also include a clearance hole, and the second counterweight tray 330 is sleeved on the rotating shaft through the clearance hole, and is fixed at a lower part of the first counterweight tray 320 by using a screw.

With the counterweight tray and the lidar in this embodiment of the present disclosure, the counterweight tray can be conveniently mounted on the base plate of the lidar body, and the counterweight block is mounted according to a requirement, to implement dynamic balance adjustment at various angles at the edge of the base plate. In addition, in this embodiment of the present disclosure, a plurality of counterweight trays may be conveniently mounted according to a requirement. The plurality of counterweight trays are combined through screw threads, and can adapt to each other. A plurality of counterweight blocks may be configured in a same direction, thereby enhancing dynamic balance adjustment.

An embodiment of the present disclosure proposes a structure of another fixing hole. In the foregoing plurality of embodiments, at least one third fixing hole is provided at a counterweight edge to fix a counterweight block. Preferably, as shown in FIG. 13A, FIG. 13B, FIG. 13C, FIG. 13D, FIG. 13E, and FIG. 13F, fixing holes may be closely provided around the base plate, and may have a plurality of shapes.

Figure 13A:
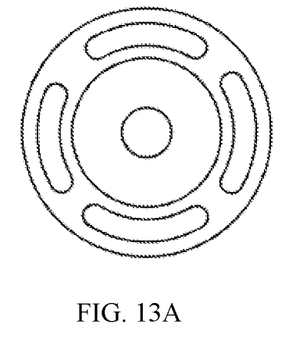
FIG. 13A is a structural diagram of a first fixing hole in another lidar according to an embodiment of the present disclosure.
Figure 13B:
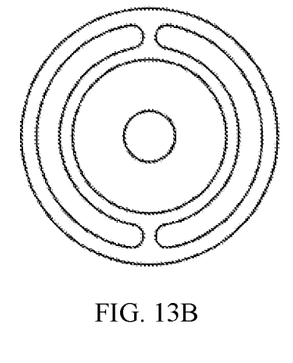
FIG. 13B is a structural diagram of a second fixing hole in another lidar according to an embodiment of the present disclosure.
Figure 13C:
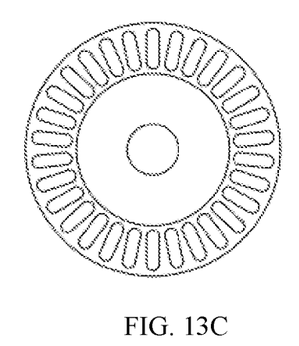
FIG. 13C is a structural diagram of a third fixing hole in another lidar according to an embodiment of the present disclosure.

Preferably, the fixing holes may be provided in a long circular shape toward an axis of the lidar body 300, as shown in FIG. 13C. In this way, when a counterweight block is fixed to the counterweight tray, a position of the counterweight block can be conveniently adjusted. For example, the counterweight block may be moved toward the axis, to adjust a distance between the counterweight block and the axis of the lidar body. In this way, the center of gravity of lidar body can be more conveniently adjusted without adding counterweight.

Optionally, the fixing holes may be alternatively provided in a ring shape along the peripheral direction of the base plate, for example, along a peripheral direction of the counterweight tray, as shown in FIG. 13A and FIG. 13B. In FIG. 13A, four long ring shapes are provided. In this way, a counterweight block can move along the peripheral direction of the base plate. In each adjustment, the center of gravity can be adjusted without removing the counterweight block. Certainly, two long ring shapes may be alternatively provided, as shown in FIG. 13B. This maximally eliminates a gap between fixing holes, so that a counterweight block can be disposed and fixed at any position, thereby improving convenience of adjustment.

Figure 13D:
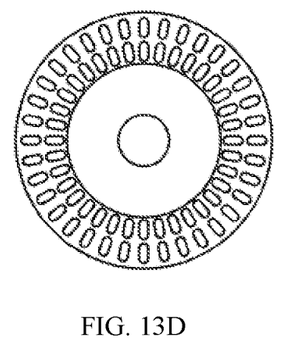
FIG. 13D is a structural diagram of a fourth fixing hole in another lidar according to an embodiment of the present disclosure.

Optionally, as shown in FIG. 13D, the fixing holes may be alternatively provided around the axis of the base plate for two circles. This can increase an adjustment range for a counterweight block and improve convenience of dynamic balance adjustment.

Figure 13E:
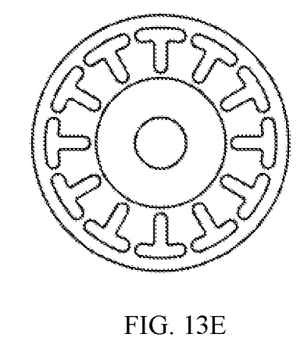
FIG. 13E is a structural diagram of a fifth fixing hole in another lidar according to an embodiment of the present disclosure.
Figure 13F:
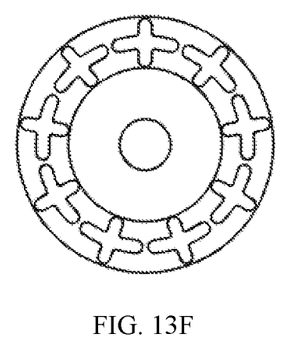
FIG. 13F is a structural diagram of a sixth fixing hole in another lidar according to an embodiment of the present disclosure.

Optionally, as shown in FIG. 13E or FIG. 13F, the fixing holes may be alternatively provided in a T shape or cross shape. In this way, a fixing block can be conveniently moved front and back or left and right, that is, a position of the fixing block is slightly adjusted in a plurality of directions, thereby improving convenience of dynamic balance adjustment. It can be understood that, in some possible embodiments, the fixing holes may be provided in a plurality of shapes that enable slight adjustment in a plurality of directions, for example, in the shape of the gān character (干) or the fēng character (丰), thereby further improving convenience of dynamic balance adjustment.

It can be understood that a specific fixing hole may be alternatively in another shape, which is not limited herein. A purpose is to better fix the fixing block and slightly adjust the position of the fixing block. In addition, an arrangement manner and arrangement density of the fixing holes may also be adjusted according to a requirement. The fixing holes may be uniformly distributed, or distribution density may be adjusted according to a requirement.

Figure 14:
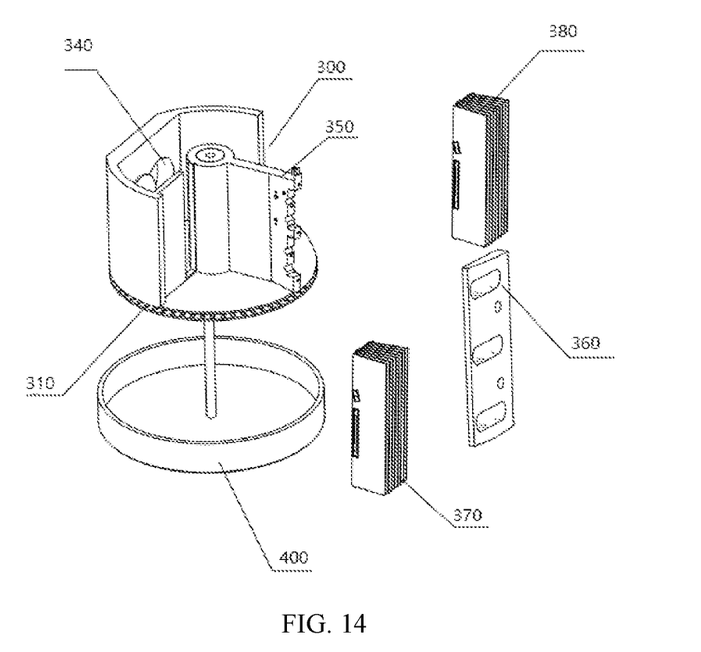
FIG. 14 is a schematic structural diagram of another lidar according to an embodiment of the present disclosure.

Certainly, in actual use, because a laser exit lens and a laser entrance lens included in the lidar body 300 are comparatively heavy, based on the lidar embodiments in FIG. 6, FIG. 7, FIG. 9, FIG. 11, and FIG. 12, special settings may be further made in a specific direction. In this embodiment of the present disclosure, weight reduction and counterweight are combined to perform dynamic balance adjustment. As shown in FIG. 14, the lidar body includes a lens bracket. Lens are disposed on the lens bracket 340, and the lens bracket 340 is usually heavy. Therefore, a crossbeam is disposed on the lens bracket 340, and a first weight reduction slot is provided on the crossbeam. In addition, a second weight reduction slot is provided on the base plate 310 on a side of the lens bracket. A first reinforcing rib is disposed in the first weight reduction slot. A second reinforcing rib is disposed in the second weight reduction slot. In addition, a movable side wall 360 is disposed at an edge of the base plate on a side away from the lens bracket 340. A long circular hole is provided on the movable side wall. The long circular hole is configured to fix a counterweight block, and a position of the counterweight block may be adjusted and fixed in the long circular hole. Optionally, the movable side wall 360 may be fixed on the lidar body by using a connecting vertical plate 350. It can be understood that, in this embodiment of the present disclosure, a counterweight block is disposed on the movable side wall, the counterweight block is disposed in the long circular hole on the movable side wall, and a position of the counterweight block may be freely adjusted, to achieve a balance with a weight on a laser lens side. In addition, in the lidar, weights of a laser emitter board 370 and a laser receiver board 380 also account for a comparatively high proportion. Therefore, the laser emitter board 370 and the laser receiver board 380 are separately disposed on two sides of the connecting vertical plate 350, to achieve a balance of weights. In this manner, the counterweight slot is provided at the bottom of the lidar body to implement omnidirectional adjustment of the center of gravity, and targeted adjustment is also performed for a specific dimension, so that the center of gravity of the lidar can be better adjusted.

To sum up, in the lidar proposed in this embodiment of the present disclosure, the counterweight slot is provided at the bottom of the lidar body, thereby implementing omnidirectional adjustment of the center of gravity of the lidar, greatly facilitating use of the lidar, and significantly increasing a service life of the lidar.

Furthermore, based on the foregoing lidar, an embodiment of the present disclosure proposes an intelligent sensing device that includes the lidar in the foregoing embodiment. The intelligent sensing device may be a car, an unmanned aerial vehicle, a robot, or another device relating to intelligent sensing and detection by using the lidar.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure. All these modifications or replacements shall fall within the scope of the claims and specification of the present disclosure. Particularly, the technical features mentioned in all embodiments may be combined in any manner, provided that no structural conflict occurs. The present disclosure is not limited to the specific embodiments disclosed in this specification, but includes all technical solutions that fall within the scope of the claims.

It should be understood that, unless otherwise specified, technical terms or scientific terms used in this application should have general meanings understood by persons skilled in the art to which the present disclosure belongs.

In the descriptions of this application, it should be understood that, directions or position relationships indicated by the terms such as "center", "longitudinal", "lateral", "length", "width", "thickness", "above", "under", "front", "rear", "left", "right", "vertical", "horizontal", "top", "bottom", "inner", "outer", "clockwise", "anticlockwise", "axial", "radial", and "peripheral" are based on the directions or position relationships shown in the accompanying drawings, and are merely intended to describe the present disclosure and simplify the descriptions, but are not intended to indicate or imply that an apparatus or a component shall have a specific direction or be formed and operated in a specific direction, and therefore cannot be understood as a limitation on the present disclosure.

In addition, the terms such as "first" and "second" are merely intended for a purpose of description, and shall not be understood as an indication or implication of relative importance or implicit indication of a quantity of indicated technical features. In the descriptions of the present disclosure, "plurality" means at least two, unless otherwise specified.

In this application, unless otherwise specified, the terms such as "mounting", "connected", "connection", and "fixing" shall be understood in a general manner, for example, may be a fixed connection, a detachable connection, or an integrated connection; may be a mechanical connection or an electrical connection; or may be a direct connection, an indirect connection by using an intermediate medium, or an internal connection or interaction between two components. Persons of ordinary skill in the art can understand specific meanings of the foregoing terms in the present disclosure according to a specific situation.

In this application, unless otherwise specified, that a first feature is "above" or "under" a second feature may be that the first feature and the second feature are in direct contact, or the first feature and the second feature are in indirect contact through an intermediate medium. In addition, that a first feature is "above" or "over" a second feature may be that the first feature is right above or not right above the second feature, or may merely indicate that a horizontal height of the first feature is greater than that of the second feature. That a first feature is "under" or "below" a second feature may be that the first feature is right under or not right under the second feature, or may merely indicate that a horizontal height of the first feature is less than that of the second feature.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure. All these modifications or replacements shall fall within the scope of the claims and specification of the present disclosure. Particularly, the technical features mentioned in all embodiments may be combined in any manner, provided that no structural conflict occurs. The present disclosure is not limited to the specific embodiments disclosed in this specification, but includes all technical solutions that fall within the scope of the claims.

What is claimed is:

1. A lidar, comprising a lidar body and a lidar base, wherein
   a center shaft is disposed on the lidar base, and the lidar body is sleeved on the center shaft;
   the lidar body comprises a base plate and a first counterweight slot, the first counterweight slot is provided at an edge of the base plate and is in a ring shape around the base plate, the first counterweight slot comprises a lower edge, at least one first fixing hole is provided at the lower edge, and the first fixing hole enables a first counterweight block to be adjusted along a peripheral direction of the base plate and toward an axis of the center shaft, and fixes the first counterweight block at any position of the first fixing hole; and
   the lidar body may rotate relative to the lidar base.

2. The lidar according to claim 1, wherein the fixing hole is in a long circular shape toward the axis of the center shaft, and the first counterweight block can slide relative to the fixing hole.

3. The lidar according to claim 1, wherein the fixing hole is in a ring shape along the circumferential direction of the base plate, and the first counterweight block can slide relative to the fixing hole.

4. The lidar according to claim 1, wherein the fixing hole is in a T shape or a cross shape, and the first counterweight block can slide relative to the fixing hole.

5. The lidar according to claim 2, wherein a plurality of fixing holes are along the edge of the base plate for at least one circle.

6. The lidar according to claim 5, wherein the lidar body further comprises a lens bracket and a movable side wall, and the movable side wall is disposed on a side opposite to the lens bracket; and
   the movable side wall comprises at least one long circular hole, wherein the long circular hole allows a second counterweight block to slide up-and-down or left-and-right along the movable side wall, and the second counterweight block can be fixed at any position of the long circular hole.

7. A lidar, comprising a lidar body and a lidar base, wherein
   a center shaft is disposed on the lidar base, and the lidar body is sleeved on the center shaft;
   the lidar body comprises a base plate and a first counterweight tray, the first counterweight tray is disposed at the bottom of the base plate via a removable screw, the first counterweight tray comprises a second counterweight edge and a second counterweight slot is formed at the edge of the base plate by the second counterweight edge and the base plate, the second counterweight slot is in a ring shape around the base plate, the counterweight tray comprises a second counterweight edge, at least one third fixing hole is provided at the second counterweight edge, and the third fixing hole enables a second counterweight block positioned in the second counterweight slot to be adjusted along a peripheral direction of the base plate and toward an axis of the center shaft, and fixes the second counterweight block at any position of the third fixing hole; and the lidar body may rotate relative to the lidar base.

8. The lidar according to claim 7, wherein the first counterweight tray is hollow, and comprises an inner screw thread and an outer screw thread, and the first counterweight tray is fixed to the base plate through the outer screw thread.

9. The lidar according to claim 8, further comprising a second counterweight tray, wherein the second counterweight tray is fixed to the first counterweight tray through an outerscrew thread.

10. The lidar according to claim 7, wherein the fixing hole is in a T shape or a cross shape, and the counterweight block can slide relative to the fixing hole.

11. The lidar according to claim 3, wherein a plurality of fixing holes are along the edge of the base plate for at least one circle.

12. The lidar according to claim 11, wherein the lidar body further comprises a lens bracket and a movable side wall, and the movable side wall is disposed on a side opposite to the lens bracket; and the movable side wall comprises at least one long circular hole, wherein the long circular hole allows a second counterweight block to slide up-and-down or left-and-right along the movable side wall, and the second counterweight block can be fixed at any position of the long circular hole.

13. The lidar according to claim 4, wherein a plurality of fixing holes are along the edge of the base plate for at least one circle.

14. The lidar according to claim 13, wherein the lidar body further comprises a lens bracket and a movable side wall, and the movable side wall is disposed on a side opposite to the lens bracket; and the movable side wall comprises at least one long circular hole, wherein the long circular hole allows a second counterweight block to slide up-and-down or left-and-right along the movable side wall, and the second counterweight block can be fixed at any position of the long circular hole.

* * * * *